United States Patent [19]

Bishop et al.

[11] 4,153,318
[45] May 8, 1979

[54] BUS STAB FOR PANELBOARD ASSEMBLY

[75] Inventors: Clifford F. Bishop; John T. Schultz, both of Cedar Rapids, Iowa

[73] Assignee: Square D Company, Park Ridge, Ill.

[21] Appl. No.: 842,430

[22] Filed: Oct. 17, 1977

[51] Int. Cl.² .................. H01R 9/18; H02B 1/20; H02G 5/00
[52] U.S. Cl. .................. 339/22 B; 339/198 N; 361/355
[58] Field of Search .................. 339/22 B, 198 N; 361/341, 342, 355, 376

[56] References Cited
U.S. PATENT DOCUMENTS

| | | | |
|---|---|---|---|
| 2,738,446 | 3/1956 | Fleming | 339/22 B X |
| 3,263,132 | 7/1966 | Bangert | 339/198 N X |
| 3,787,712 | 1/1974 | Diersing | 339/22 B X |

*Primary Examiner*—Roy Lake
*Assistant Examiner*—E. F. Desmond
*Attorney, Agent, or Firm*—Norton Lesser; Richard T. Guttman

[57] ABSTRACT

The following specification describes a bus stab for a panel-board assembly comprising a U shaped bus stab arranged to establish a connection to either a spring clip terminal of a plug-on type circuit breaker or to a bolt-on type terminal of a circuit breaker.

4 Claims, 8 Drawing Figures

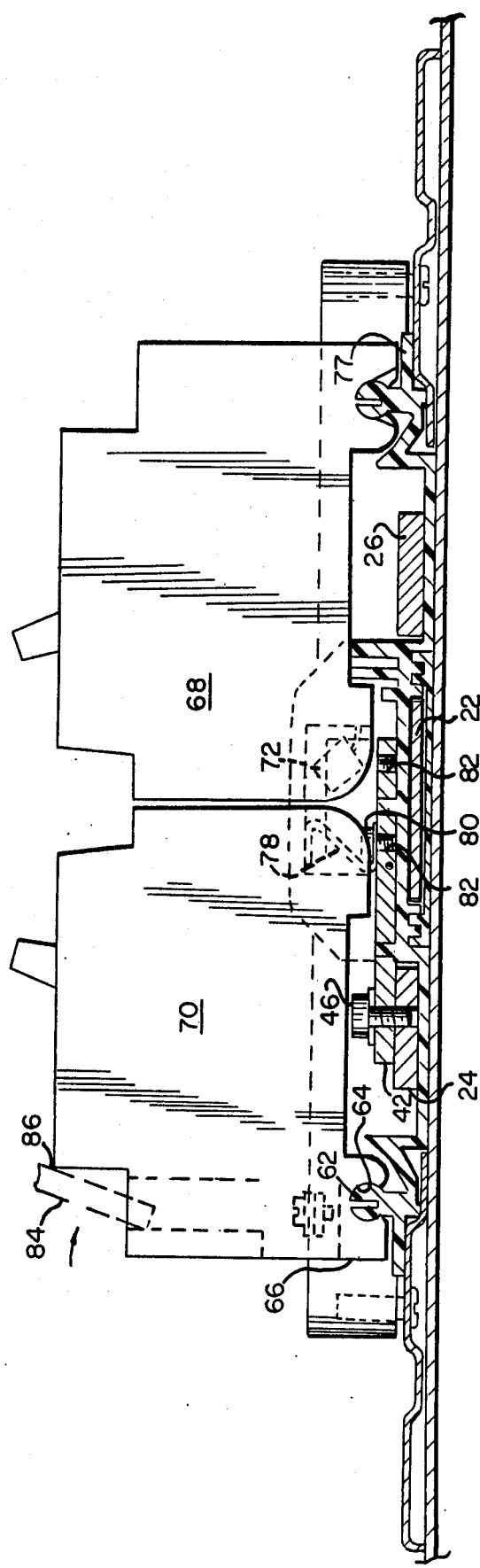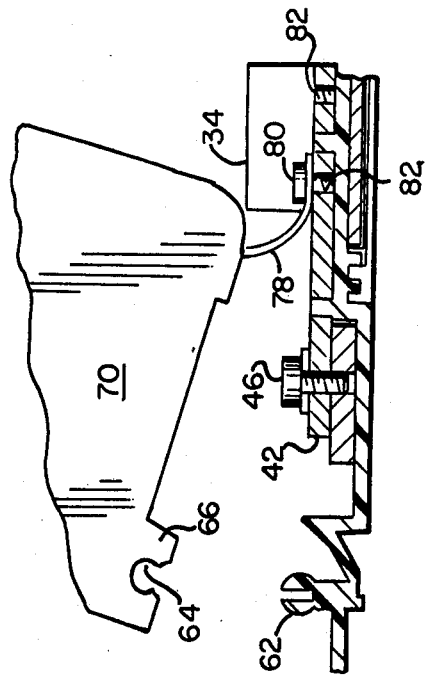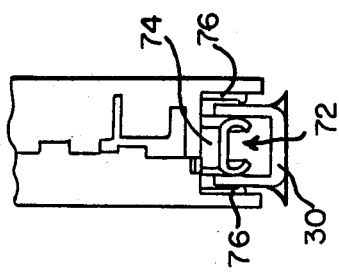

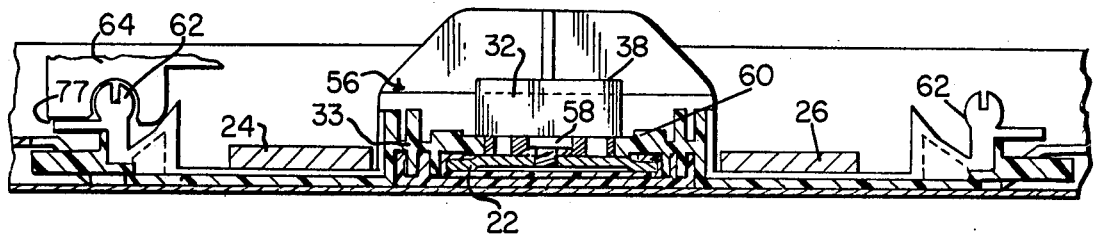
FIG. 3
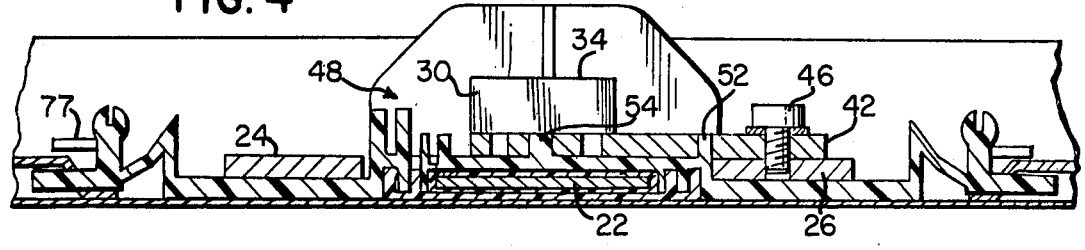
FIG. 4
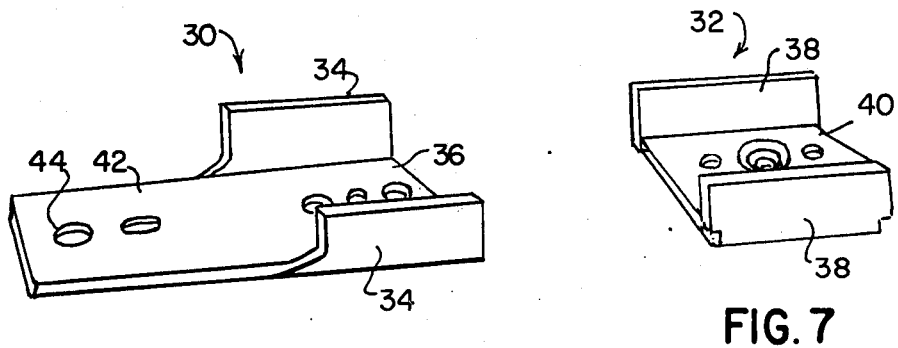
FIG. 8
FIG. 7

BUS STAB FOR PANELBOARD ASSEMBLY

BACKGROUND OF THE INVENTION

1. Field of the Invention

This invention relates in general to panelboard assemblies and more particularly to an improved bus stab for use in a panelboard assembly.

2. Summary of the Prior Art

In a typical panelboard assembly such as shown in U.S. Pat. Nos. 3,105,173, 3,134,050 and 3,173,063, generally planar bus stabs extend from respective bus bars supplying electrical power. Circuit breakers which connect the bus stabs and bars to the various circuits carry a spring metal clip or terminal adjacent one end for engagement with the bus stab to extend an electrical connection from the respective bus bar.

While the described arrangement works well, it is desirable to improve the heat dissipation and the character of the electrical connection to the bus stab.

Another type of circuit breaker known as a bolt-on circuit breaker is disclosed in application Ser. No. 748,607 filed by Erickson and it utilizes a foldable strap terminal, which has one end bolted to a bus stab. It is also desired for the bus stab to accept either a spring clip type circuit breaker terminal or a bolt-on type circuit breaker terminal.

In a copending application Ser. No. 842,432, filed Oct. 17, 1977 filed by Diersing, Schweikle and Stanback, an interior assembly is provided with an insulated mounting rail or rib along each edge of the assembly and the bus stabs are located therebetween. Each rib is used for engaging an end of the circuit breaker housing spaced from the terminal connected to the bus stab. It is therefore also desirable to provide a bus stab which can, in addition to accept both a spring clip type terminal or a bolt-on type terminal, also facilely receive a circuit breaker having a housing secured to a mounting rail spaced from either end of the bus stab.

SUMMARY OF THE INVENTION

The present invention provides a simple U shaped bus stab or branch connector, which can accept either a plug-on or bolt-on circuit breaker and is capable of use with a panelboard assembly of novel design as described in the aforementioned Diersing application.

The U shape permits a spring clip terminal connection from one circuit breaker to be established to both side legs of the U to thereby provide four positions of metal contact for improved heat dissipation and electrical engagement. The back leg of the U alternatively engages the strap terminal of a bolt-on type circuit breaker so that the U shape serves as a universal bus stab.

In addition, the U shaped bus stab receives the terminal of a circuit breaker housing extending from either of the interior assembly mounting rails and irrespective of whether the circuit breaker is of the plug-on or bolt-on type. This permits the close spacing of the circuit breakers without excessive concern over tolerances.

It is, therefore, among the primary objects of the present invention to provide an improved bus stab for use in a panelboard assembly.

It is another object of the present invention to provide an improved bus stab for a panelboard bearing circuit breaker mounting rails extending along opposite edges.

Other objects and features of the present invention will become apparent on examination of the following specification and claims together with the drawings.

BRIEF DESCRIPTION OF THE DRAWINGS

FIG. 2 is a sectional view of the interior assembly taken generally along the line 2—2 in FIG. 1.

FIG. 3 is a sectional view of the interior assembly taken generally along the line 3—3 in FIG. 1.

FIG. 4 is a sectional view taken generally along the line 4—4 in FIG. 1.

FIG. 5 is a partial sectional view illustrating a bolt-on type circuit breaker in partially removed position.

FIG. 6 is a partial end view of a plug-on type circuit breaker illustrating the spring clip terminal thereon engaging a bus stab.

FIG. 7 is an isometric view of a bus stab utilized with the center bus bar of the interior assembly; and FIG. 8 is an isometric view of a bus stab utilized with the side bus bar.

DESCRIPTION OF THE PREFERRED EMBODIMENT

Figure 1:
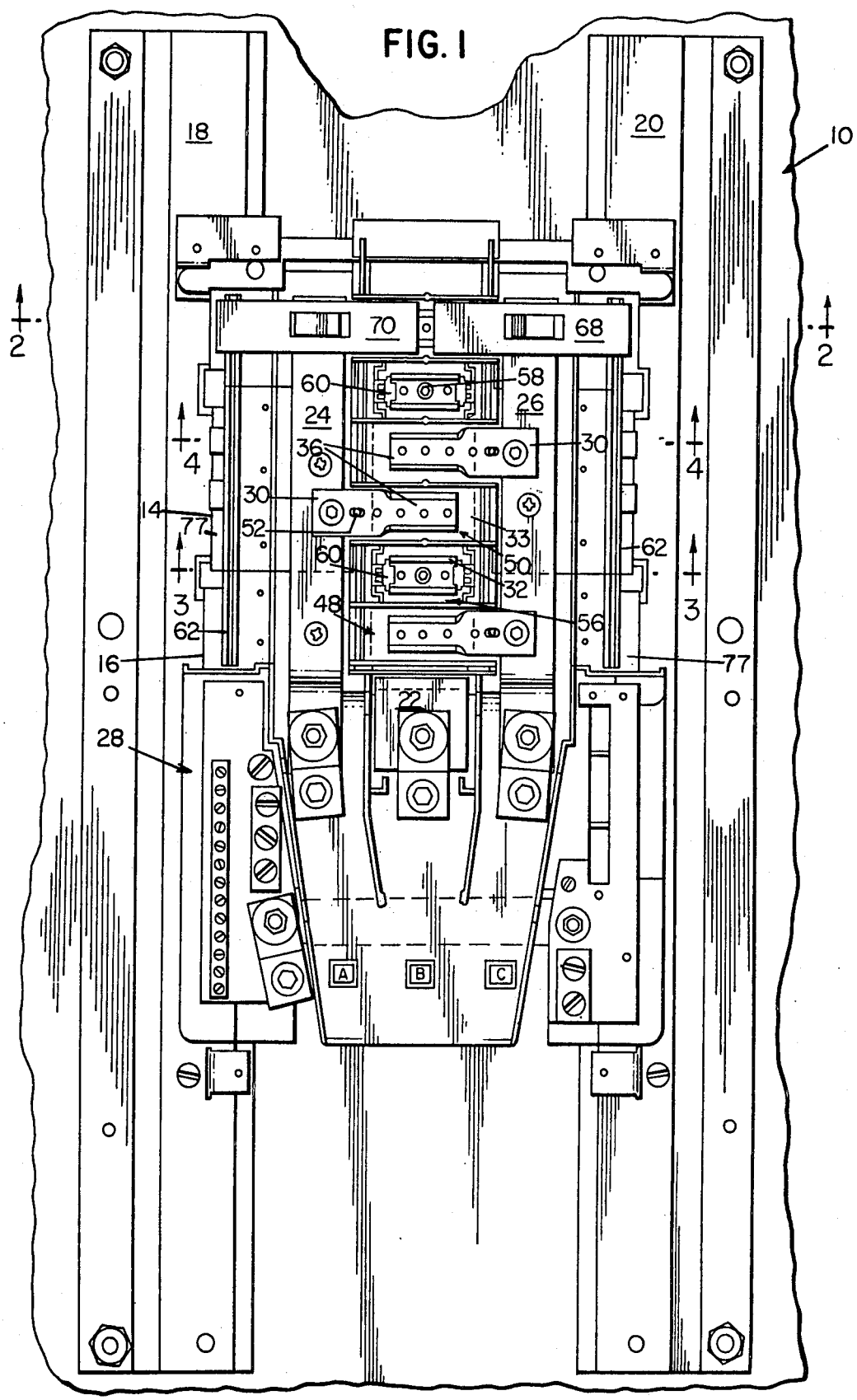
FIG. 1 is a front elevational view of an interior assembly carrying a plurality of bus stabs incorporating the principles of the present invention.

Referring now more specifically to the drawings, an interior assembly for a panelboard utilized with 270/480 volt AC systems is indicated in FIG. 1 by the reference character 10. The assembly 10 includes a plurality of modular insulators or bases 12, 14 and 16 arranged in tandem as explained in the aforementioned Diersing application.

The bases 12, 14 and 16 are secured in bridging relationship to a pair of spaced apart rail members 18 and 20 and carry a center bus bar 22 and spaced side or outer bus bars 24 and 26 in close heat transmitting relationship to a cabinet in which the interior assembly is mounted. A neutral assembly 28 is located on one end base 16 and the terminals and ends of the bars are also secured to base 16.

The interior assembly includes a plurality of spaced bus stabs or branch connectors 30 and 32 carried on a central raised rib 33 of each base. The connectors 30 and 32 are each U shaped in cross section with connectors 30 having side legs 34 and a back leg 36 and connector 32 having side legs 38 and a back leg 40.

The stabs 30 each have a tab 42 extending from the back leg or wall 36 in which an aperture 44 is formed for fastening the bus stab to respective side bus bars 24 or 26 by means of screws 46. The bus stabs 30 are fastened to a respective bus bar at positions in alignment with respective compartments 48 and 50 as explained in the aforementioned Diersing application so that the U shaped portion overlaps the central rib and center bus bar 22 with the back leg supported by a planar wall of the rib. Locating bosses such as 52 and 54 on the rib extend into correspondingly spaced apertures of the stab 30.

Each connector 32 is located in a respective compartment 56 of the central rib and an opening or passage in the rib enables the back leg of the connector to be fastened to the center bus bar 22 by means of screws 58. Rib walls 60 extend from the sides of each center compartment 56 and are nestingly received by the side and back legs or walls of the connector 32 to hold the connector against rotation.

The bases 12, 14 and 16 each have integral split bead or rail 62 extending longitudinally adjacent opposite edges. The beads 62 are adapted to be resiliently received in a recess or cutout 64 formed in a housing portion 66 of either a plug-on circuit breaker 68 or a bolt-on type circuit breaker 70. The breakers extend transversely from the bead 62 to a position overlapping a respective center compartment so as to be aligned parallel with the side legs 34 or 38 of the bus stabs and to overlap the corresponding back wall.

The plug-on breaker 68 carries a spring terminal clip 72 adjacent the end opposite the recess 64. The clip 72 comprises a U shaped center member 74 and two side members 76 spaced adjacent a respective side leg of member 74 so as to clamp each side leg 34 or 38 of the bus stabs 30 and 32 respectively between the center member 74 and a respective side member 76. The breaker is engaged with the stab by simply inserting the legs 34 or 38 between the members 74 and 76 while pressing the recess 64 into engagement with rail 62. Legs 34 or 38 engaged with members 74 and 76 provide four positions of contact or engagement between the bus stab and terminal 72 to improve electrical engagement and heat transmission. A breaker having a single pair of spring legs may, of course, also be used to engage either leg of the bus stab depending on which mounting rail the breaker extends from. It will also be seen that the position of the spring clip may vary substantially and still engage the bus stab conveniently when the breaker is secured to the rail 62, and that two breakers 68 each mounted on a different rail 62 in aligned relationship may engage the same side legs 34 or 38.

The breaker 68 may be disassembled from the interior assembly by simply pivoting the breaker against a tongue 77 on the insulator as explained in the aforementioned Diersing application to free the breaker from the mounting rail 62 and provide disengagement.

The bolt-on type of circuit breaker 70, which may be of the type described in application Ser. No. 748,607 filed Dec. 8, 1976, and now abandoned in favor of continuation in part application Ser No. 842,450 filed Oct. 17, 1977. carries a flexible strap terminal 78 as explained in the aforementioned Erickson application. Terminal 78 is bolted on to the back leg 36 of the connector 30 or back leg 40 of connector 32 by means of screw 80 extending into one of a pair of threaded openings 82 in each back leg. The terminal 78 is then folded beneath the breaker to form a segment in overlapping relationship to the back leg 36 or 40 and the breaker recess 64 is then engaged with a rail 62. By providing a pair of spaced threaded openings 82 in the back leg of the stab a breaker 70 on either mounting rail 62 may be secured to stab 30 or 32 with the terminal 78 folded under the breaker 70. This permits a pair of breakers 70 mounted on opposing side rails 62 to connect to the same stab back leg 36 or 40.

To disassemble the circuit breaker 70 from the bus stab, a screwdriver, indicated by dashed lines 84, is inserted in a slot above the mounting rail and levered against a corner 86 of the housing and located intermediate the rail and stab to squeeze one section of the split rail 62 toward the other section to free the housing from the rail. This is necessary since the length of terminal 78 prevents its movement after folding. With the breaker disengaged from the rail 62 the terminal may be unfolded and disengaged from the bus stab.

It will also be understood from the foregoing that a breaker 68 having a spring clip 72 and mounted on one rail 62 may engage the same bus stab as a breaker 70 having a terminal 78.

The foregoing constitutes a description of an improved bus stab whose invention concepts are believed set forth in the accompanying claims.

What is claimed is:

1. A bus stab in an interior assembly of a panelboard adapted to be mounted in a metal cabinet for use in establishing an electrical connection from a bus bar to a respective terminal of a pair of circuit breakers, each of said circuit breakers carrying a respective terminal at a position spaced adjacent one end of the respective circuit breaker, the improvement comprising;

a back leg for said stab having a tab extending from one end of said back leg and adapted to be fastened to said bus bar, a pair of spaced parallel side legs transverse to said back leg and extending from said back leg along a portion of said back leg, an electrically insulating member having a generally planar wall engaging said back wall to support said bus stab on said cabinet in close heat transmitting relationship to said cabinet, rail means integrally formed on said insulating member and engaging each circuit breaker of said pair or positioning the one end of each of said pair of circuit breakers in overlapping relationship to said back leg with each circuit breaker of said pair secured adjacent a respective opposite end to said rail means and extending towards said portion of said back leg along an axis located intermediate said parallel side legs, each of said side legs adapted to engage with a spring clip terminal carried adjacent the one end of a respective one of said circuit breakers, said portion of said back leg having a pair of spaced openings for securing a bolt-on terminal carried adjacent the one end of a respective circuit breaker of said pair of circuit breakers to secure said bolt-on terminal at a respective position on said back leg.

2. The improvement claimed in claim 1 in which each bolt-on terminal is positioned in parallel overlapping relationship to said back leg and is overlapped by a respective one of said circuit breakers.

3. A bus stab for use in an interior assembly of a panelboard having a pair of insulated resilient mounting rails spaced from a respective one of a pair of side bus bars having a center bus bar located intermediate said side bus bars with each mounting rail adapted to be engaged by a circuit breaker housing carrying either a bolt-on terminal or a spring clip terminal. the improvement comprising:

a U-shape for said bus stab, said bus stab having a back leg and a pair of side legs, said bus stab positioned in overlapping relationship to said center bus bar with each side leg of said stab adapted for engaging a pair of said spring clip terminals each carried by said housing engaged with a respective one of said rails, and means on the back leg of said U-shape for engaging a pair of said bolt-on terminals each carried by said housing engaged with a respective one of said rails, each of said bolt-on terminals comprises a flexible metal strap in parallel overlapping relationship to said back leg.

4. A bus stab connection in an interior assembly of a panelboard to establish an electrical connection from a bus bar to a circuit breaker, the improvement comprising:
- a bus stab having a back leg and first and second parallel side legs extending transverse to said back leg,
- a circuit breaker having a spring terminal clip, said spring clip terminal including a generally U-shaped center member with first and second side fingers of said U-shaped center member spaced for receipt between said first and second parallel side legs of said bus stab and engaged with a respective one of said side legs, said clip also including first and second parallel side portions,
- said first side portion extending substantially parallel to said first side finger and spaced a predetermined distance outward from said first side finger with said predetermined distance substantially corresponding to the thickness of said first side leg of said bus stab,
- said second side portion extending substantially parallel to said second side finger and spaced a second predetermined distance outward from said second side finger with said second predetermined distance substantially corresponding to the thickness of said second side leg of said bus stab, said terminal clip adapted to receive said first side leg of said bus stab between said first side finger and said first side portion and to receive said second side leg of said bus stab between said second side finger and said second side portion,
- whereby four positions of engagement are provided for contact between said bus stab and said spring terminal clip.

* * * * *

UNITED STATES PATENT AND TRADEMARK OFFICE
CERTIFICATE OF CORRECTION

PATENT NO. : 4,153,318

DATED : May 8, 1979

INVENTOR(S) : Clifford F. Bishop; John T. Schultz

It is certified that error appears in the above-identified patent and that said Letters Patent are hereby corrected as shown below:

Column 2, line 41, insert --bus-- before "bars";

Column 4, line 53, change "." to --,--.

Signed and Sealed this

Twenty-fifth Day of September 1979

[SEAL]

Attest:

*Attesting Officer*

LUTRELLE F. PARKER
*Acting Commissioner of Patents and Trademarks*